Sept. 13, 1960  R. WIKEN  2,952,081
GEAR COMPARATOR

Filed Jan. 19, 1959  3 Sheets-Sheet 1

INVENTOR
RALPH WIKEN

BY Roger Sherman Hoar

ATTORNEY

Sept. 13, 1960 R. WIKEN 2,952,081
GEAR COMPARATOR
Filed Jan. 19, 1959 3 Sheets-Sheet 2

INVENTOR
RALPH WIKEN
BY
ATTORNEY

Sept. 13, 1960 R. WIKEN 2,952,081
GEAR COMPARATOR
Filed Jan. 19, 1959 3 Sheets-Sheet 3

INVENTOR
RALPH WIKEN

BY
*Roger Sherman Hoar*

ATTORNEY

United States Patent Office 2,952,081
Patented Sept. 13, 1960

2,952,081

GEAR COMPARATOR

Ralph Wiken, Bayside, Wis., assignor to The Falk Corporation, Milwaukee, Wis., a corporation of Wisconsin Filed Jan. 19, 1959, Ser. No. 787,644

7 Claims. (Cl. 35—13)

This invention relates to gear comparators; and more particularly resides in a slide chart for visually comparing the variation in total length of tooth contact of an intermeshing pair of spur involute gears on the one hand, and one the other hand an intermeshing pair of helical involute gears; the object being to demonstrate the superiority of helical involute gears over spur involute gears, from the point of view of load carrying capacity, which is based on minimum total contact length.

Such a chart will be referred to generically as a comparator for visually comparing the variation in total length of tooth contact of helical involute gearing with the variation of total length of tooth contact of spur involute gearing.

A further object of the present invention is to devise a mechanism for actuating such a chart.

Other objects and advantages will appear from the description which follows.

In the description, reference is made to the accompanying drawings, forming a part hereof, in which there is shown by way of illustration and not of limitation a certain specific form in which the machine of the present invention may be embodied, and certain possible departures therefrom.

In the drawings.

Throughout the description, the same reference numeral is applied to the same member or to similar members.

In gear parlance, especially when dealing with parallel shaft involute gearing, it is customary to describe certain characteristics of the gears as they would appear on the drafting board, projected upon the plane of rotation: i.e., any plane normal to the axes of the gears. Thus planes are frequently referred to as lines, cylinders as circles, and lines as points. Accordingly to avoid confusing circumlocutions, this technique will be followed herein when applicable.

Figure 1:
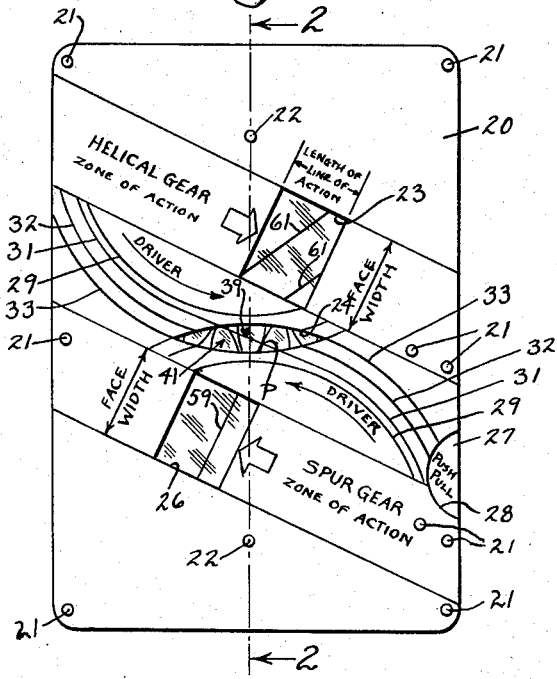
Fig. 1 is a plan view of the preferred embodiment of the comparator of the present invention.

Referring now to the drawings, more particularly to Fig. 1. Although that figure represents a plan view of the entire comparator, all that actually shows in this figure is the cover 20, the heads of rivets 21 and 22 which secure the layers of the comparator together (the two rivets 22 also serving as pivots, as will be explained hereinafter), parts of the internal mechanism which are exposed through three windows 23, 24, and 26 (as will be explained hereinafter), and the manual push-pull tab 27 which is exposed by a notch 28 in the right-hand edge of the cover.

Certain arrows and descriptive printed matter are printed on the cover, as shown in Fig. 1. Also printed on the cover are arcs of four significant circles of the two intermeshing gears simulated by the internal mechanism of the comparator. These circles are, from inside outward: the root circle 29, the base circle 31, pitch circle 32, and the outside circle 33. These circles are projections of the correspondingly named cylinders upon the plane of rotation.

Figure 2:
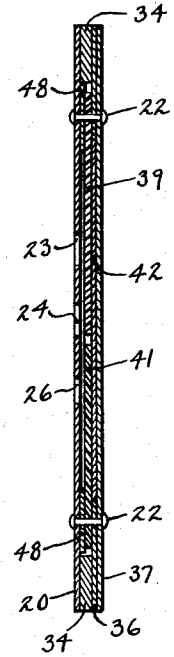
Fig. 2 is a lengthwise cross-section of the same, seen as though cut along the line 2—2 of Fig. 1.
Figure 3:
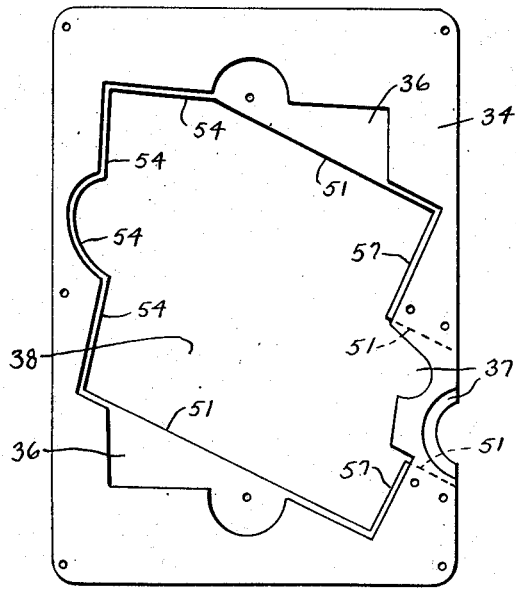
Fig. 3 is a plan view of three layers of the frame, with the cover and all movable parts removed.

Fig. 2 (which is a lengthwise cross-section of the comparator seen as though cut along the line 2—2 of Fig. 1) and Fig. 3 (which is a plan view of the comparator, with the cover and movable parts removed) show that the comparator is built upon a four layer structure, collectively known as the "frame," and consisting of: the cover 20, already described, a thick filler layer 34, a guide layer 36, and a back 37. The base, guide layer, and back, should be of some thin fairly rigid material, such as a fine grained cardboard. The filler layer can be of coarse cardboard. The cover, the back, and the edge portions of the filler layer and guide layer, define a central cavity 38, designed to contain the movable parts.

The movable parts consist of an upper gear sector 39, a lower gear section 41, and a slide 42.

Figure 4:
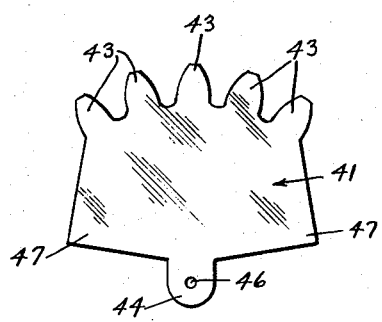
Fig. 4 is a plan view of one of the gear sectors.

The gear sectors should preferably, but need not be substantially identical. The outline of one is shown in Fig. 4. Each gear sector, considered as an element of an operative model, obviously has to have a finite thickness; but represents a sector of an infinitely thin cross-section of an involute gear (either spur or helical) in a plane of rotation. To save circumlocution, in the claims it will be called a "thin gear sector."

In the embodiment shown, the gear sectors overlie the slide, and hence at least portions of the sectors should be transparent, so as to disclose through the windows in the cover 20 certain lines marked on the slide, which lines will be explained later herein. Or the slide could overlie the gear sectors, in which event at least the central part of the slide should be transparent, so as to disclose through central window 24 the outline of the meshing teeth of the gear sectors.

In the preferred embodiment, the two gear sectors 39 and 41 are made of transparent celluloid somewhat thinner than the thick filler layer 34, to give the sectors freedom to rotate. Each gear sector comprises a plurality (five, as shown) of successive involute teeth 43, a tab 44 containing a central hole 46 to pivot the sector on rivet 22, and two wings 47. These wings serve to stiffen the sectors and to present a uniform appearance under windows 23 and 26. To take up most of the difference in thickness of thick filler layer 34 and each gear sector at each pivot rivet 22, there is provided at each such rivet a cardboard washer 48.

Preliminary to discussing slide 42, some definitions will now be given.

In involute gearing the "plane of action" (i.e., the locus of all points of gear-tooth contact, and said locus extended) is the imaginary plane which is tangent to the base cylinders of both gears. Inasmuch as there are two such tangents, it is important to note which of these two is the plane of action. It is that one of the two tangents which shows the points of contact as moving continuously away from the driving base circle as motion proceeds.

The "zone of action" is that portion of the plane of action in which tooth contact actually takes place.

At any given instant, two gear teeth which are in moving contact with each other touch each other in a single line, known as a "line of contact." Although this is a different line at each instant, it can be represented as a sidewise moving line, rather than as a succession of lines. The "total length of tooth contact" is the sum of the lengths of all lines of contact existing at any given instant.

The "line of action" is the projection of the plane of action on the plane of rotation.

In referring on cover 20 to the "length of the line of action," what is meant is really the "length of action": i.e., the length of that portion of the line of action in which tooth contact actually takes place: i.e., the projection of the zone of action on the plane of rotation. It will be referred to herein as the "length of action."

Figure 5:
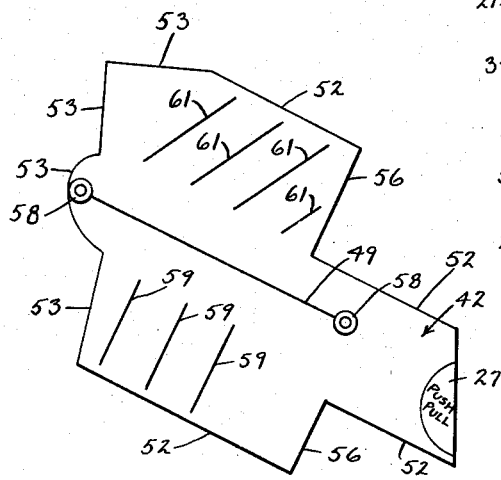
Fig. 5 is a plan view of the slide.

The slide 42 and certain markings thereon are shown in Fig. 5. It is preferably of the same material and thickness as the guide layer 36. 49 is a line drawn on the slide to indicate the position of the actual line of action and lies thereon. The conformation of, and the other markings on, the slide will be discussed later herein.

Figure 6:
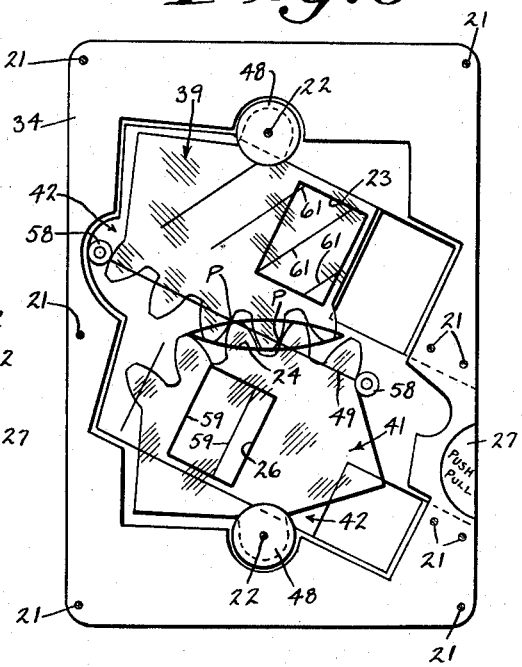
Fig. 6 is a plan view of the complete comparator, except the cover, but with the position of the three windows of the cover indicated by heavy lines. The slide is pushed in to its limit.
Figure 7:
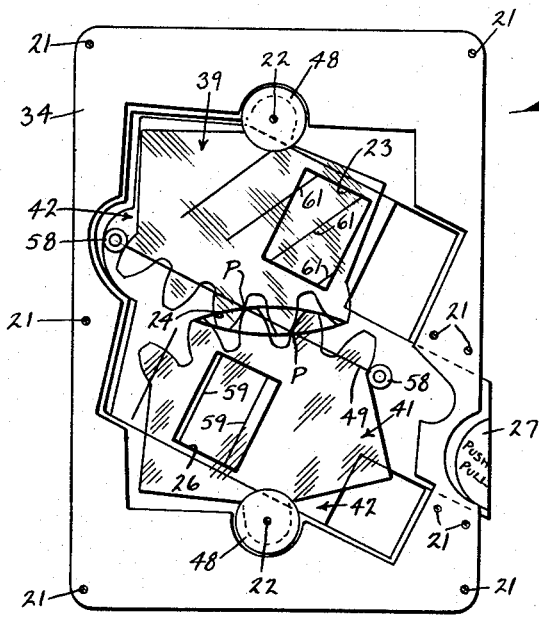
Fig. 7 is the same as 6, but with the slide pulled out slightly.
Figure 8:
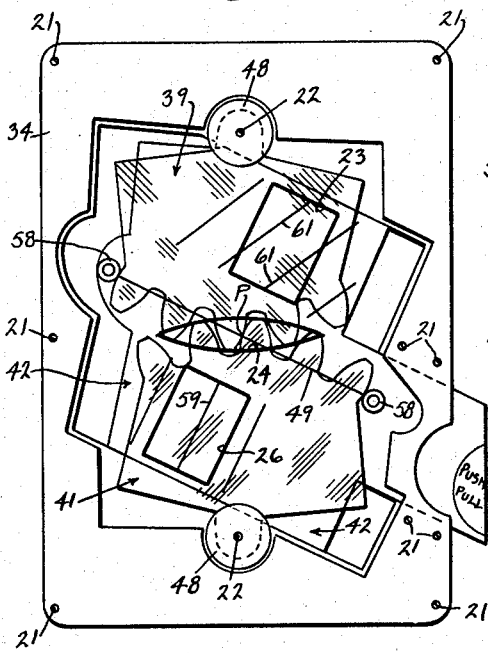
Fig. 8 is the same as 7, but with the slide pulled out somewhat further.
Figure 9:
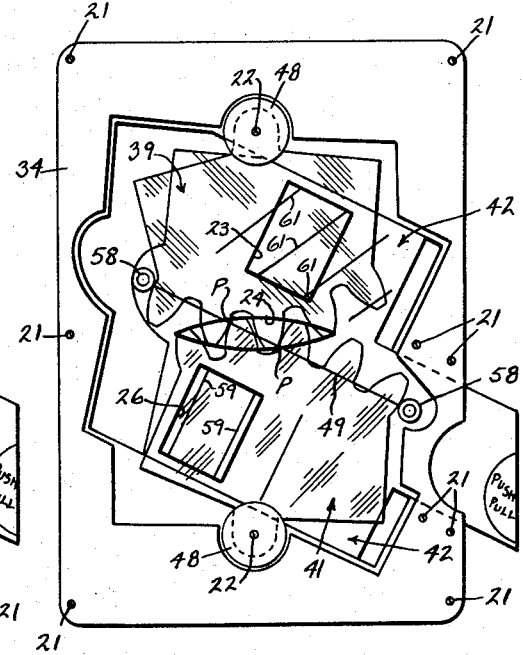
Fig. 9 is the same as 8, but with the slide pulled out still further.

Fig. 6 shows the slide 42 and the two gear sectors 39 and 41 assembled on the three layers of the frame which were shown in Fig. 3. The cover is not shown in Figs. 6 to 10, but the position of each of the three windows 23, 24, and 26 of the cover is indicated by heavy lines. The slide is pushed in (i.e., to the left) to the limit.

Let us now compare Figs. 3 and 5. Edges 51 of guide layer 36 are parallel to the actual line of action. Edges 52 of slide 42 bear the same relation to line 49 drawn on the slide as edges 51 of the guide layer do to the actual line of action. Accordingly when the slide is in any of its slid positions in the frame, line 49 indicates the position of the actual line of action. The portion of this line which is seen through window 49, i.e., the portion intercepted between outside circles 33 of the two gears, is the only portion on which gear contact actually takes place.

When slide 42 is slid to its left-most position, as seen in Fig. 6, its edges 53 contact corresponding edges 54 of guide layer 36, and thus these two sets of edges cooperate to constitute stop means to limit linear movement of the slide to the left.

Figure 10:
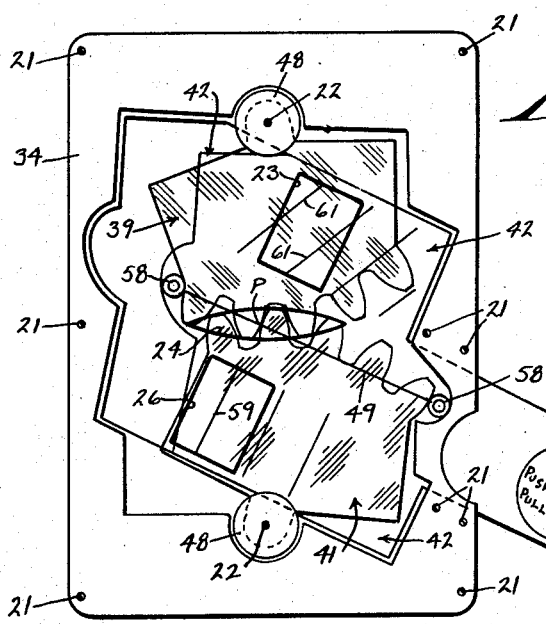
Fig. 10 is the same as 9, but with the slide pulled out to the limit.

When slide 42 is slid to its right-most position, as seen in Fig. 10, its edges 56 contact corresponding edges 57 of guide layer 36, and thus these two sets of edges cooperate to constitute stop means to limit linear movement of the slide to the right.

The actuation of the slide will now be discussed. See Fig. 5. On slide 42, at each end of line 49 drawn thereon, there is a projecting pin 58. These two projecting pins are so located on the slide that when the slide is in its left-most position as shown in Fig. 6, one projecting pin 58 has a point contact with the involute portion of the far profile of the left tooth of upper sector 39, and the other projecting pin 58 has a point contact with the involute portion of the far profile of the right tooth of lower sector 41. Then, as the slide moves through its successive positions of Figs. 6 to 10 and back again, the two projecting pins 58 will move along the involute portions of the respective profiles, constraining between them all the intermediate teeth. Thus either one of the projections can impel the drive sector while the other restrains the driven sector.

One of the theories upon which the present invention is based is that, when two involute gears rotate intermeshed, the distance along their line of action from where that line intersects the involute portion of the far profile of any tooth of one gear to where that line intersects the involute portion of the far profile of any tooth of the other gear, will remain constant, provided and so long as the line of action intersects both said involute portions, and provided and so long as both such intersections lie outside of that portion of the line of action intercepted by the points of tangency thereof to the two base circles.

There will now be discussed what is seen through the three windows 24, 26, and 23 of the cover 20, and what it represents.

As indicated by the two curved arrows printed on the cover and by the word "Driver" which accompanies each of them (see Fig. 1), either of the two gear sectors can serve as the driver in the direction of the respective arrow. Thus when tab 27 is pulled, slide 42 causes upper gear sector 39 to rotate counterclockwise and drive gear sector 41 clockwise. When tab 27 is pushed, slide 42 causes lower gear sector 41 to rotate counterclockwise and drive gear sector 39 clockwise.

The driving points of contact are located on line of action 49 and are indicated by the letter P. Apparent points of contact not so located and indicated are not points of contact.

Fig. 1 shows what is seen. Figs. 6 to 10 show, with the cover removed, what is happening behind the scenes as tab 27 is pulled out, Fig. 6 corresponding to Fig. 1. In Figs. 6 to 10, the positions of the three windows are outlined in heavy black lines, as already mentioned.

The narrow central window is bounded by intersecting arcs of the outside circles 33 of the two gear sectors 39 and 41, and shows the intermeshing teeth of the two sectors, and the line 49 which is drawn on the slide 42 to represent the line of action. So much of line 49 as is intercepted by the edges of this window represents the length of action.

What is seen through narrow central window 24 represents what takes place in a plane of rotation of a pair of intermeshing involute gears, either spur or helical. In the case of a pair of spur gears the view through this window represents what takes place in any plane of rotation, whereas in the case of a pair of helical gears it represents what takes place in the nearest plane of rotation.

What is seen through lower rectangular window 26 indicates diagrammatically what takes place in the zone of action of a pair of involute spur gears as lines 59 drawn on slide 42 (see Fig. 5), sweep successively across this window, representing successive lines of contact of the two gears.

Similarly what is seen through upper rectangular window 23 indicates diagrammatically what takes place in the zone of action of a pair of involute helical gears as lines 61 drawn on slide 42, sweep successively across this window representing successive lines of contact of the two gears.

Spacing in a direction parallel to line 49 between successive lines 59, and between successive lines 61, is the base pitch of both sorts of gears represented; and the angle at which lines 61 are inclined to lines 59 is the base helix angle of the helical gears represented.

It should be understood that each of these lines 59 to 61 drawn on the slide, represents a line of contact only while, and to the extent that, the drawn line is within the confines of its window. For obviously there can be no contact between two teeth beyond the width of their gears, nor before the two teeth have rolled into contact, nor after they have rolled out of contact. Each of windows 26 and 23 has a width equal to the length of action and a length equal to the face width of the gears.

Inasmuch as the zone of action actually lies in a plane perpendicular to the planes of rotation, its representation does not have to be located in any particular place on the comparator with relation to the location of the representation of the intermeshing gears in the plane of action as seen through central window 24. All that is necessary is that rectangular windows 26 and 23 be properly oriented with relation to the motion of the slide 42. But, for convenience in comparing the two alternative portrayals of the zone of action, windows 26 and 23 should lie across line 49 from each other perpendicular to line 49, with their sides aligned with the ends of that portion of line 49 exposed through central window 24. Also each line 59 should be aligned with a point P of tooth contact and with the adjacent end (as seen through upper window 23) of a line 61.

Consider now the diagrammatic representation of a pair of intermeshing involute spur gears afforded by central window 24 and lower window 26, as slide 42 is pulled through its cycle from Fig. 6 to Fig. 10, or is pushed back again. Comparing the successive views through the lower window, it is evident that there are always either one or two lines of contact each equal in length to the face width of the gears, and that the minimum total length of tooth contact is only half the maximum. Since the load carrying capacity of a gear must be determined by minimum contact, spur gear rating has to be based on single tooth contact.

Contrast the diagrammatic representation of a pair of intermeshing involute helical gears afforded by central window 24 and upper window 23, as slide 42 as pulled through its cycle from Fig. 6 to Fig. 10, or is pushed back again. Comparing the successive views through the upper window, it is evident that the variation between maximum and minimum total tooth contact is very slight, and that the minimum is larger than in the case of comparable spur gears. Thus as between comparable spur gears and helical gears, the latter are deservedly assured of a much higher rating.

All of this can, of course, be demonstrated by mathematical calculation. But visual demonstration by the use of the comparator of the present invention is much more impressive and hence is more likely to stick in the memory.

From the foregoing description it will be seen that the present invention constitutes a new and useful comparator for visually comparing the variation in total length of tooth contact of helical and spur gearing, including new and useful means for actuating the same.

Now that one embodiment of the invention has been shown and described, it is to be understood that the invention is not to be limited to the specific use, form, or arrangement of parts herein shown and described.

What is claimed is:

1. In a comparator for visually comparing a characteristic of helical involute gearing with the corresponding characteristic of spur involute gearing, the combination comprising: a supporting frame; a pair of intermeshing involute thin gear sectors; means pivoting each sector on the frame at the axis of that sector; a slide, constrained by the frame to move linearly with respect to the frame, parallel to the line of action of the two sectors; stop means limiting each end of such linear movement; means to be grasped manually to move the slide from limit to limit; and means for converting the linear motion of the slide into rotary motion of the two sectors, said converting means comprising: two pins projecting from the slide, the two pins being so located on the slide that one of the pins contacts the involute portion of the far profile of a tooth of one of the sectors at said profile's intersection with the line of action, and the other of the pins contacts the involute portion of the far profile of the other of the sectors at said profile's intersection with the line of action, the teeth selected being teeth the involute portion of the far profile of each of which, during the limited motion of the slide, always intersects the line of action and at a point outside of that portion of the line of action intercepted by the points of tangency thereof to the base circles.

2. In a comparator for visually comparing a characteristic of helical involute gearing with the corresponding characteristic or spur involute gearing, the combination comprising: a supporting frame; a pair of intermeshing involute thin gear sectors; means pivoting each sector on the frame at the axis of that sector; a slide, constrained by the frame to move linearly with respect to the frame, parallel to the line of action of the two sectors; stop means limiting each end of such linear movement; means to be grasped manually to move the slide from limit to limit; and means for converting the linear motion of the slide into rotary motion of the two sectors, said converting means comprising: two pins projecting from the slide on the line of action, so located and spaced apart that, as the slide moves from limit to limit, one pin will move along the involute portion of the far profile of one tooth of one of the sectors, and the other pin will move along the involute portion of the far profile of one tooth of the other sector, constraining between the two pins the intermediate engaging teeth of the two sectors.

3. In a comparator for visually comparing a characteristic of helical involute gearing with the corresponding characteristic of spur involute gearing, the combination comprising: a supporting frame; a pair of intermeshing involute thin gear sectors; means pivoting each sector on the frame at the axis of that sector; a slide, constrained by the frame to move linearly with respect to the frame, parallel to the line of action of the two sectors; stop means limiting each end of such linear movement; means to be grasped manually to move the slide from limit to limit; sector engagement means on said slide adapted to alternately move first one and then the other of said sectors for simultaneous angular movement of said sectors.

4. In a comparator for visually comparing a characteristic of helical involute gearing with the corresponding characteristic of spur involute gearing, the combination comprising: a supporting frame; a pair of intermeshing involute thin gear sectors; means pivoting each sector on the frame at the axis of that sector; a slide, constrained by the frame to move linearly with respect to the frame, parallel to the line of action of the two sectors; stop means limiting each end of such linear movement; means to be grasped manually to move the slide from limit to limit; and means for converting the linear motion of the slide into rotary motion of the two sectors, characterized by the facts that: at least a portion of whichever of the slide and the pair of sectors overlies the other is transparent; the frame includes a cover which overlies the slide and the pair of sectors, and which cover has three windows overlying the transparent portion to disclose successive portions of the slide and of the pair of sectors as the slide is manipulated, and the slide has indicia printed thereon, to successively show through the respective windows to indicate digrammatically features of gear meshing which are characteristic of both helical and spur involute gears, and features of gear meshing which are characteristic of each of said two types of gears alone.

5. A comparator according to claim 4, wherein the pair of sectors overlie the slide.

6. A comparator according to claim 4, wherein one window in the cover discloses so much of the intermeshing teeth of the two sectors as is intercepted between the outside circles of the two sectors; and wherein there is a line drawn on the slide to represent the line of action of the two sectors; and wherein so much of said line as is seen through said window at any stage of the manipulation of the slide represents that portion of the line of action in which tooth contact actually takes place; and wherein each of the second and third windows in the cover is rectangular, and each such window has a width parallel to the line of action and equal to the length of action; and each such window has a length equal to the face width of the gears represented by the sectors; and wherein there are drawn on the slide a first succession of lines parallel to the sides of the second window, which lines successively pass across said second window widthwise as the slide is manipulated, and as seen through said window represent the lines of contact of the pair of spur gears represented by two sectors; and wherein there are drawn on the slide a succession of parallel lines inclined to the sides of the third window which lines successively pass across said third window widthwise as the slide is manipulated, and as seen through said window represent the lines of contact of the pair of helical gears represented by the two sectors; whereby the comparator visually demonstrates that the total length of tooth contact of a pair of intermeshing helical involute gears varies less than does the total length of tooth contact of a comparable pair of spur involute gears, and that the minimum total length of tooth contact of a pair of intermeshing helical involute gears is greater than the minimum total length of tooth contact of a comparable pair of spur involute gears.

7. A comparator according to claim 6, wherein the second and third windows lie on opposite sides of the representation of the line of action, with their corresponding sides aligned with the ends of so much of that portion of the line representing the line of action of the two sectors as is seen through the first window and wherein the two successions of parallel lines are so located on the slide that each of the first sucession of parallel lines, during its exposure through the second window, will be aligned with a point of tooth contact exposed through the first window, and with the adjacent end of one of the second succession of parallel lines as seen through the third window.

References Cited in the file of this patent

UNITED STATES PATENTS

| | | |
|---|---|---|
| 1,497,433 | Eaton et al. | June 10, 1924 |
| 2,470,246 | Heisman | May 17, 1949 |
| 2,477,441 | Cole | July 26, 1949 |
| 2,692,443 | Milligan | Oct. 26, 1954 |

OTHER REFERENCES

Text-book: Mechanics of Machinery, Ham & Crane, 3rd Ed. (1948), McGraw-Hill (pages 95–97 only).

UNITED STATES PATENT OFFICE
CERTIFICATE OF CORRECTION

Patent No. 2,952,081　　　　　　　　　　September 13, 1960

Ralph Wiken

It is hereby certified that error appears in the printed specification of the above numbered patent requiring correction and that the said Letters Patent should read as corrected below.

Column 1, line 19, for "one the other hand" read -- on the other hand --; column 5, lines 28 and 29, for "as pulled" read -- is pulled --; column 6, line 5, for "characteristic or" read -- characteristic of" --; column 7, line 8, for "represented by two sectors" read -- represented by the two sectors --.

Signed and sealed this 4th day of April 1961.

(SEAL)

Attest:　ERNEST W. SWIDER

XXXXXXXXX
Attesting Officer

ARTHUR W. CROCKER
Acting Commissioner of Patents